United States Patent Office 3,574,566
Patented Apr. 13, 1971

3,574,566
NITROGEN- AND PHOSPHORUS-CONTAINING
COMPOSITION SUITABLE FOR APPLICA-
TION TO METAL SURFACES
Charles E. Dwors, Wickliffe, Ohio, assignor to
The Lubrizol Corporation, Wickliffe, Ohio
No Drawing. Filed Apr. 18, 1968, Ser. No. 722,198
Int. Cl. G08g 17/10, 17/133
U.S. Cl. 29—195                                       25 Claims

ABSTRACT OF THE DISCLOSURE

A composition of matter, suitable for application to metal surfaces, is prepared by the reaction of (A) the product of the reaction of a benzene polycarboxylic reactant, a polyhydric alcohol or phenol, and phosphoric acid, phosphorus or a mixture thereof, with (B) an aliphatic amine material having at least about 8 carbon atoms. The composition is especially useful as a component of siccative organic coating compositions.

---

This invention relates to novel phosphorus and nitrogen-containing compositions suitable for use in providing protective films for metal surfaces. It also relates to processes by which such compositions are prepared and processes by which such compositions are applied to metal surfaces to form protective films.

The corrosion of metal articles is of obvious economic significance in many industrial applications and, as a consequence, the inhibition of such corrosions is a matter of prime consideration. It is significant for example, to users of steel and other ferrous alloys. The corrosion of such ferrous metal alloys is largely a matter of rust formation, which in turn involves the overall corrosion of the free metal to its oxide.

The theory which best explains such oxidation of ferrous metal surfaces postulates the essential presence of both water and oxygen. Even minute traces of moisture are sufficient, according to this theory, to induce the dissolution of iron therein and the formation of ferrous hydroxide until the water becomes saturated with ferrous ions. The presence of oxygen causes oxidation of the resulting ferrous hydroxide to ferric hydroxide which then settles out of solution and is ultimately converted to ferric oxide or rust.

Other metal surfaces likewise are vulnerable to corrosion by the oxygen of the atmosphere and moisture. Aluminum, magnesium, copper and galvanized surfaces are subject to such corrosion.

Such corrosion can be prevented, or at least in large measure inhibited, by relatively impermeable coatings which have the effect of excluding moisture and/or oxygen from contact with the metal surface. Such coatings are often exposed to high humidity, corrosive atmospheres, high impact, flexing, etc., and to the extent that these coatings are penetrated or otherwise harmed by such influences they become ineffective for the desired purpose. It is also important that such coatings adhere tightly to the metal surface and resist flaking, crazing, blistering, powdering, and other forms of loss of adhesion. A satisfactory corrosion-proofing coating, then, must have the ability to resist flexing, high impact, weathering, high humidity, and corrosive atmospheres such as salt-laden mists or fogs, air contaminated with industrial wastes, etc.

Frequently, it is desirable to provide a metal surface which not only is protective with respect to corrosion but also decorative, i.e., in the nature of a paint. Such a decorative coating in addition to the desirable properties mentioned above, should have a high gloss, be hard, and have "hiding" power, i.e., it should have enough pigment to cover or obliterate the metal surface.

Various derivatives of acid esters of phosphoric or phosphorothioic acids have been investigated by the workers engaged in the task of providing protective coatings for metals. In U.S. Pat. 2,080,299, for example, Benning et al. propose the treatment of ferrous metals with phosphate acid esters of their alkali metal or ammonia salts to prevent rusting. Somewhat similarly, Butler and Le Suer (U.S. Pats. 2,861,907 and 2,820,723) find that salt-esters of complex phosphorothioic acids are effective in preventing or retarding the corrosion of metals.

Although such known derivatives of phosphoric and phosphorothioic acids have provided means for combating the corrosion of metals they have not been completely satisfactory because of certain inherent shortcomings. The simple salt-esters of phosphoric acid are readily washed and abraded from a metal surface and thus provide complete protection only in a favorable environment. The salt-esters of phosphorothioic acids on the other hand have a disadvantage, under certain conditions, of developing an objectionable odor reminiscent of hydrogen sulfide, particularly when a film of such a salt-ester comes in contact with water or a humid atmosphere.

A further disadvantage of these known derivatives of phosphoric and phosphorothioic acids is that they form oily or tacky coatings which are not susceptible to the subsequent application of top-coats of siccative organic coating compositions such as paint, varnish, lacquer, enamel, primers, synthetic resins, and the like. Thus, their use has been limited to metal articles such as bulk castings, metal fasteners, firearm parts, arm cables, etc., which do not require a dry-film protective coating.

Although known, siccative, organic coating compositions have been useful in protecting metal articles against corrosion, the degree of protection in many instances has been less than desired. In humid, corrosive environments, films of such known coating compositions generally exhibit a tendency to separate from the metal surface and thus expose such surface to corrosion. In an effort to improve adhesion and corrosion resistance of known siccative organic coating compositions, workers in the field of protective coatings have investigated various chemical pretreatments for metal articles including metal passivating solutions, aqueous phosphating solutions, and the like. Although successful in some instances, they have not significantly improved adhesion of a film of a siccative organic coating composition to a galvanized metal article. Thus, it is common knowledge in the metal finishing industry that paint, enamels, etc., adhere very poorly to galvanized metal articles.

It is, therefore, an object of this invention to provide new phosphorus and nitrogen-containing compositions.

Another object of this invention is to provide methods for producing novel phosphorus and nitrogen-containing compositions.

Another object of this invention is to provide new corrosion-preventing coating compositions for metals.

Another object of this invention is to provide new siccative organic coating compositions containing the above phosphorus- and nitrogen-containing compositions.

Another object of this invention is to provide coated metal articles.

These and other objects are accomplished by providing a phosphorus- and nitrogen-containing composition prepared by the process comprising mixing (A) a phosphorus-containing composition prepared by the process comprising heating at a temperature of at least about 50° C. a mixture comprising from about 1 to about 15 moles of a benzene polycarboxylic reactant selected from the class consisting of acids and anhydrides; from about 1 to about 15 moles of a poly-hydroxy compound selected from the class consisting of polyhydric alcohols and polyhydric phenols; and about 1 mole of a phosphorus acid reactant selected from the group consisting of phosphorus pentoxide, phosphoric acid, and mixtures thereof, with (B) an aliphatic amine having at least about 8 carbon atoms.

The process of preparing the phosphorus-containing composition of (A) may be carried out simply by mixing and heating the three indicated reactants at a temperature of at least about 50° C. Likewise, it may be produced by combining any two of the three indicated ingredients to form an intermediate and finally reacting the intermediate with the remaining third reactant. The final reactions, including the simultaneous chemical combination of all three indicated reactants, are accomplished by heating the reaction mixtures at from about 50° C. to about 200° C. for about 1–24 hours. Ordinarily, the benzene polycarboxylic reactant and the poly-hydroxy compound are initially mixed, optionally reacted, mixed with the phosphorus acid reactant, and the whole is heated preferably at a temperature of from about 100° C. to about 175° C. for 1.5–15 hours. When phosphorus pentoxide is to be added to the reaction mixture, the temperature of the reaction mixture should initially be less than about 100° C. to avoid undue scorching of the final product.

The use of a solvent for these reaction mixtures is contemplated and is especially desirable in many instances. A solvent may be used to insure the ready mixing of the reactants during reaction. Solvents useful in this respect include hydrocarbon solvents, such as xylene and mineral spirits, as well as oxygenated solvents such as methyl isobutyl ketone, isobutyl alcohol, and butyl Cellosolve.

Water is a by-product of the process of preparing the phosphorus-containing composition of (A). Water formation may be noted during the simultaneous reaction of all three components, during intermediate formation, and during the final reaction of any given intermediate with the remaining third reactant. Separation of water from the reaction mass finally or at an intermediate stage is not a critical requirement in the production of these compositions; useful products are produced regardless of whether or not the water is removed. In many instances, however, water removal is used as a basis for determining the progress of the reaction. In some instances, e.g., where the final composition is to be used as an air dry type coating, water removal is often desirable.

The benzene polycarboxylic reactant contains at least two carboxylic groups selected from the class consisting of acid and anhydride groups. These include trimellitic acid, hemimellitic acid, trimesic acid, terephthalic acid, m-phathalic acid, 1,2,3,4-benzene tetracarboxylic acid, o-phthalic acid, and the anhydrides of one or more moles thereof. These anhydrides, as indicated, may be polymeric or monomeric. Of these, trimellitic anhydride ($C_9H_4O_5$), a monomeric type, is preferred because of its general availability and relatively low cost. Molar ratios referred to herein are based on the monomeric structure.

The poly-hydroxy compounds may be alcoholic or phenolic. They include compounds containing from 2 to about 6 hydroxyl radicals. The hydrocarbon residue may contain other radicals which are inert for the purposes of this invention, such as, halo, nitro, ether (including polyether), thioether, ester (including esters of carboxylic acids and carbamic acids) and other radicals. Included in this class are polyhydric phenols and polyhydric alcohols such as diols, triols, tetritols, penitols, hexitols, or other higher polyhydric alcohols or phenols. They include, for example, catechol, resorcinol, hydroquinone, ethylene glycol, propylene glycol, trimethylene glycol, 1,2-propanediol, 1,3-propanediol, 1,3-butanediol, 1,4-butanediol, 2,3-butanediol, trans-2-butene-1,4-diol, 2-butene-1,4-diol, 2,4-pentanediol, 1,5-pentanediol, 2,4-hexanediol, 1,5-hexanediol, 1,6-hexanediol, 2,5-hexanediol, 2-methyl-1,3-pentanediol, 2-methyl-2,4-pentanediol, 2,3-dimethyl-2,3-butanediol, 2,4-heptanediol, 3,3-di(hydroxymethyl) pentane, 2-ethyl-1,3-hexanediol, 2-ethyl-1,1-di(hydroxymethyl) pentane, and neopentyl glycol. Also useful for the purpose of this invention are the polyalkylene glycols, including polyethylene glycols, polypropylene glycols, and the polyethylene-polypropylene glycols. Examples of these include diethylene glycol, triethylene glycol, tetraethylene glycol, and dipropylene glycol. The polyalkylene glycols are prepared by polymerization of ethylene oxide and/or propylene oxide, respectively. The preferred molecular weight range for the indicated polyalkylene glycols is from about 106 to about 3000 for the polyethylene glycols, from about 134 to about 2000 for the polypropylene glycols, and up to about 5000 for the polyethylene-polypropylene glycols. Triols useful herein include glyceral, trimethylolethane, trimethylolpropane, and 1,2,6-hexanetriol. Useful higher alcohols include erythritol, pentaerythritol, ribitol, sorbitol, d-mannitol, dipentaerythritol, and copolymers of allyl alcohol and the styrene having molecular weights from about 500 to about 2500. The latter copolymer may contain from 10 to 90 mole percent of allyl alcohol and 90–10 mole percent of a styrene.

The phosphorus acid reactant used in preparing the phosphorus-containing composition of (A) may be phosphoric acid, phosphorus pentoxide or mixtures of phosphoric acid and phosphorus pentoxide. This includes pyrophosphoric acid and metaphosphoric acid, as well as the various polyphosphoric acids, all of which are readily formed by mixing the proper amounts of water with phosphorus pentoxide. Aqueous solutions of phosphoric acid such as commercial 85% aqueous phosphoric acid may be used. Aqueous solutions having lower concentrations of phosphoric acid, such as 75% or lower, may be used, the lower concentration limit being a practical matter relating to reaction mixture compatibility, reactivity, and the end use of the reaction product.

Useful compositions may be prepared from the processes of this invention wherein from about 1 to about 15 moles of the benzene carboxylic reactant, from about 1 to about 15 moles of the polyhydroxy hydrocarbon, and about 1 mole of the phosphorus acid reactant are utilized. Because of greater product versatility, it is preferred to use from about 2 to about 4 moles of the benzene carboxylic reactant, from about 2 to about 10 moles of the polyhydroxy hydrocarbon, and about 1 mole of the phosphorus acid. The preferred range for the polyhydroxy hydrocarbon is further qualified dependent upon how many hydroxyl radicals there are per molecule of the selected reactant. Thus, when a diol, such as neopentyl glycol, is used the preferred molar range is from about 2 to about 10 moles, whereas when a hexitol, such as dipentaerythritol, is used the preferred range is from about 2 to about 4 moles.

Specific examples of the preferred compositions of this invention include reaction products prepared from 10 moles of trimesic acid, 10 moles of dipropylene glycol, and 1 mole of phosphorus pentoxide; 4 moles of hemimellitic acid, 2 moles of dipentaerythritol, and 1 mole of phosphorus pentoxide; 4 moles of trimesic acid, 2 moles of sorbitol, and 1 mole of phosphorus pentoxide; 4 moles of trimesic acid, 2 moles of a copolymer (molecular weight: 1150) of equimolar portions of allyl alcohol and styrene, and 1 mole of phosphorus pentoxide; 15 moles of trimellitic acid, 10 moles of neopentyl glycol, and 1 mole of phosphorus pentoxide; 2 moles of trimellitic acid, 10 moles of neopentyl glycol, and 2 moles of phosphoric acid; 3 moles of trimellitic anhydride; 10 moles of triethylene glycol, and 1 mole of phosphorus pentoxide; 3 moles of trimellitic anhydride, 6 moles of trimethylolethane, and 1 mole of phosphorus pentoxide; 3 moles of trimellitic anhydride, 8 moles of glycerol, and 1 mole of phosphorus pentoxide; and 3 moles of trimellitic anhydride, 7.5 moles of neopentyl glycol, and 1 mole of phosphorus pentoxide.

The following examples are submitted to illustrate specific modes of preparing the phosphorus-containing compositions used as (A) in this invention. They are presented for the purpose of illustration only and are not to be construed as limiting the scope of the present invention except as the latter is defined by the appended claims. All parts are by weight unless otherwise indicated.

EXAMPLE 1

To 780 grams (7.5 moles) of neopentyl glycol at 130° C. there is added 576 grams (3 moles) of trimellitic anhydride. The reaction mixture is heated at 120°–157° C. for 20 minutes. The reaction mixture is heated at 155°–160° C. and blown with nitrogen gas for 1.25 hours causing 42 milliliters of water to be separated from the reaction mixture. The reaction mixture has an acid number of 141 (phenolphthalein). Phosphorus pentoxide (142 grams or 1 mole) is added to the acidic reaction mixture at 100°–118° C. (exothermic) within 10 minutes. The reaction mixture has a dark brown coloring. The reaction mixture is heated at 145–160° C. and purged with nitrogen gas for 50 minutes causing 20 milliliters of water to be separated from the reaction mixture. The reaction mixture, a dark amber colored and clear liquid, is mixed with 1438 grams of isobutyl alcohol (solvent), stirred at 90° C. for 1 hour, and filtered. The product has a phosphorus content of 2.1%, an acid number of 32 with bromphenol blue indicator, and an acid number of 102 with phenolphthalein indicator.

EXAMPLE 2

The procedure of Example 1 is repeated except that 630 grams (3 moles) of trimellitic acid is used in lieu of the trimellitic anhydride.

EXAMPLE 3

The procedure of Example 1 is repeated except that 796 grams (7.5 moles) of diethylene glycol is used in lieu of the neopentyl glycol.

EXAMPLE 4

The procedure of Example 1 is repeated except that 990 grams (7.5 moles) of 2,4-heptanediol is used in lieu of the neopentyl glycol.

EXAMPLE 5

The procedure of Example 1 is repeated except that 572 grams (7.5 moles) of propylene glycol is used in lieu of the neopentyl glycol.

EXAMPLE 6

The procedure of Example 1 is repeated except that 781 grams (7.5 moles) of 1,5-pentanediol is used in lieu of the neopentyl glycol.

EXAMPLE 7

The procedure of Example 1 is repeated except that 1010 grams (7.5 moles) of dipropylene glycol is used in lieu of the neopentyl glycol.

EXAMPLE 8

A mixture of methyl isobutyl ketone (1438 grams), neopentyl glycol (780 grams or 7.5 moles), and trimellitic anhydride (576 grams or 3 moles) is heated to 81° C. Phosphorus pentoxide (142 grams or 1 mole) is added to the reaction mixture at 81–90° C. (exothermic) within 6 minutes. The $P_2O_5$-treated reaction mixture is heated at 123–125° C. for 8 hours causing 62 milliliters of water to be removed. The reaction mixture is cooled to room temperature. The product has a phosphorus content of 2.1%, an acid number of 54 with bromphenol blue indicator, and an acid number of 118 with phenolphthalein indicator.

EXAMPLE 9

A mixture of methyl isobutyl ketone (1438 grams), neopentyl glycol (780 grams or 7.5 moles), and trimellitic anhydride (576 grams or 3 moles) is heated at 125°–128° C. for 6.33 hours causing 42 milliliters of water to be removed. Phosphorus pentoxide (142 grams or 1 mole) is added to the reaction mixture at 97°–101° C. (exothermic) within 10 minutes. The $P_2O_5$-treated reaction mixture is refluxed for 0.5 hour and heated at 125° C. for 6 hours causing 21 milliliters of water to be removed. The product, a dark amber fluid, is cooled to room temperature. The product has a phosphorus content of 2.1%, an acid number of 51 with bromphenol blue indicator, and an acid number of 121 with phenolphthalein indicator.

EXAMPLE 10

The procedure of Example 9 is repeated except that 3190 grams (7.5 moles) of a commercial polypropylene glycol having a molecular weight of 425 is used in lieu of the neopentyl glycol.

EXAMPLE 11

The procedure of Example 9 is repeated except that 2250 grams (7.5 moles) of a commercial polyethylene glycol having a molecular weight of 300 is used in lieu of the neopentyl glycol.

EXAMPLE 12

Trimellitic anhydride (2160 grams or 11.3 moles) is added to neopentyl glycol (2925 grams or 28.1 moles) at 130–120° C. The reaction mixture is heated at 140°–147° C. for 0.5 hour and then heated at 155°–160° C. and blown with nitrogen gas for 1 hour causing 158 milliliters of water to be removed. The reaction product has an acid number of 156 (phenolphthalein). Phosphorus pentoxide (532.5 grams or 3.75 moles) is added to the reaction mixture at 100°–130° C. (exothermic) in 5 minutes. The temperature rises (exothermic) to 136° C. in 5 minutes. The $P_2O_5$-treated reaction mixture is heated at 136°–163° C. and blown with nitrogen gas for 50 minutes causing 82 milliliters of $H_2O$ to be removed. The reaction product is mixed with 3585 grams of butyl Cellosolve, stirred for 1 hour at 90° C. mixed with a filtering aid, and filtered. The product, an amber liquid, has a phosphorus content of 2.5%, an acid number of 72 with bromphenol blue indicator, and an acid number of 119 with phenolphthalein indicator.

EXAMPLE 13

Trimellitic anhydride (576 grams or 3 moles) is added to neopentyl glycol (780 grams or 7.5 moles) at 130°–112° C. The mixture is heated at 130° C. for 45 minutes. Phosphorus pentoxide (142 grams or 1 mole) is added to the mixture at 132°–160° C. (exothermic) in 0.25 hour. The reaction mixture is heated at 156°–164° C. and blown with nitrogen gas for 1.33 hours causing 62 milliliters of water to be removed. Methyl isobutyl ketone (719 grams) is added to the reaction mixture and the whole is stirred for 1 hour at 95° C. Additional methyl isobutyl ketone (719 grams) is added to the re-added to the mixture at 132°–160° C. (exothermic) in tered. The product has a phosphorus content of 1.9%, an acid number of 45 with bromphenol blue indicator, and an acid number of 85 using phenolphthalein indicator. The product has a dark amber color.

EXAMPLE 14

To 260 grams (2.5 moles) of neopentyl glycol at 135° C. there is added 192 grams (1 mole) of trimellitic anhydride. The reaction mixture is held at 120°–144° C. until clear. The reaction mixture is heated at 144° C. for 1.5 hours causing 14 milliliters of water to be separated from the reaction mixture. To the reaction mixture at 140°–90° C. there is added 57.5 grams (0.5 mole) of commercial 85% aqueous phosphoric acid over a period of 15 minutes. The phosphoric acid-containing mixture is heated at 134°–147° C. for 1 hour causing 25 milliliters of water to be separated from the reaction mixture. The resulting composition is the product.

EXAMPLE 15

To 855 grams (8.22 moles) of neopentyl glycol at 145° C. there is added 363 grams (1.89 moles) of trimellitic anhydride. The mixture is heated at 135°–160° C. for 30 minutes. Nitrogen gas is bubbled through the mixture at 155°–160° C. for 1.5 hours causing 24 milliliters of water to be separated from the reaction mixture. To the reaction mixture at 90° C. there is added 142 grams (1 mole) of phosphorus pentoxide in 7 minutes and the temperature of the reaction mixture rises to 123° C. Nitrogen gas is bubbled through the reaction mixture as it is heated to 158° C. in 1 hour, causing 16.5 milliliters of water to be separated from the reaction mixture. To the reaction mixture at 90° C. there is added 880 grams of butyl Cellosolve and the resulting mixture is stirred at 55° C. for 1 hour. The product, an amber fluid, has a phosphorus content of 2.78%, an acid number of 51 with bromphenol blue indicator, and an acid number of 99 with phenolphthalein indicator.

EXAMPLE 16

To 562 grams (5.4 moles) of neopentyl glycol at 145° C. there is added 273 grams (1.42 moles) of trimellitic anhydride. The mixture is held at 135°–145° C. for 0.5 hour. Nitrogen is bubbled through the mixture at 145°–161° C. for 1.33 hours causing 20 milliliters of water to be separated from the reaction mixture. To the reaction mixture at 94° C. there is added 213 grams (1.5 moles) of $P_2O_5$ and the temperature rises to 176° C. Nitrogen is bubbled through the reaction mixture at 145°–170° C. for 0.75 hour causing 11 milliliters of water to be separated from the reaction mixture. To the reaction mixture at 100° C. there is added 675 grams of butyl Cellosolve. The resulting mixture is stirred at 60°–70° C. for 1.5 hours. The product, a slightly viscous amber liquid, has a phosphorus content of 5.43%, an acid number of 125 with bromphenol blue indicator, and an acid number of 175 with phenol-phthalein indicator.

EXAMPLE 17

A mixture of methyl isobutyl ketone (456 grams), 1,5-pentanediol (104 grams or 1 mole), 1,2,6-hexanetriol (134 grams or 1 mole), and trimellitic anhydride (192 grams or 1 mole) is heated to 80° C. Phosphorus pentoxide (47 grams or ⅓ mole) is added to the reaction mixture at 80°–87° C. (exothermic) within 7.5 minutes. The reaction mixture is heated at 118°–121° C. for 4.25 hours causing 21 milliliters of water to be removed from the reaction. The reaction mixture is cooled to room temperature. The product has a phosphorus content of 2%, an acid number of 69 using bromphenol blue indicator, and an acid number of 161 using phenolphthalein indicator.

EXAMPLE 18

A mixture of methyl isobutyl ketone (481 grams), neopentyl glycol (208 grams or 2 moles), catechol (55 grams or 0.5 mole), and trimellitic anhydride (192 grams or 1 mole) is heated at 77° C. Phosphorus pentoxide (47 grams or ⅓ mole) is added to the reaction mixture at 77°–91° C. (exothermic). The reaction mixture is heated at 127° C. for 7.75 hours causing removal of 20 milliliters of water from the reaction mixture. The reaction mixture is cooled. The product has a phosphorus content of 2.1%, an acid number of 66 using bromphenol blue indicator, and an acid number of 135 using phenolphthalein indicator.

EXAMPLE 19

A mixture of methyl isobutyl ketone (645 grams), trimethylolpropane (54 grams or 0.4 mole), a copolymer (molecular weight: 1150) of equimolar portions of allyl alcohol and styrene (460 grams or 0.4 mole), and trimellitic anhydride (115 grams or 0.6 mole) is heated to 85° C. Phosphorus pentoxide (28 grams or 0.2 mole) is added to the reaction mixture at 85°–96° C. (exothermic) within 5 minutes. The reaction mixture is heated at 116°–120° C. for 7.17 hours causing removal of 13 milliliters of water. The reaction mixture is cooled. The product has a phosphorus content of 1%, an acid number of 46 using bromphenol blue indicator, and an acid number of 81 using phenolphthalein indicator.

EXAMPLE 20

A mixture of methyl isobutyl ketone (528 grams), dipropylene glycol (268 grams or 2 moles), dipentaerythritol (42 grams or 0.17 mole), and trimellitic anhydride (192 grams or 1 mole) is heated to 120° C. The reaction mixture is cooled to 64° C. and then phosphorus pentoxide (47 grams or ⅓ mole) is added thereto within 10 minutes. The reaction mixture is heated at 123° C. for 7 hours causing 9.2 milliliters of water to be removed. The reaction mixture is cooled to room temperature. The product has a phosphorus content of 1.9%, an acid number of 65 using bromphenol blue indicator, and an acid number of 157 using phenolphthalein indicator.

The aliphatic amines contemplated for use as reactant (B) should, as indicated, have at least about 8 carbon atoms. Illustrative amines include isooctyl amine, n-decyl amine, n-dodecyl amine, n-tetradecyl amine, n-hexadecyl amine, n-octadecyl amine, 2,2,4,4,6,6-hexamethyl hexyl amine, 2,2,4-trimethyl pentyl amine, eicosyl amine, triacontyl amine and tetracontyl amine.

The mixing of (A) with (B) results in an exothermic reaction. It is not necessary to heat the resulting mixture, nor is the reaction so exothermic as to require cooling. The phosphorus-containing composition of (A) is acidic and the reaction with the aliphatic amine is in the nature of a neutralization. The relative proportions of amine should be such as to provide from about 0.5 to about 2.5 grams atoms of nitrogen per gram atom of phosphorus in (A). A particularly preferred product for certain purposes is prepared by the mixing of an aliphatic amine and a phosphorus-containing composition of (A) in such proportions as to provide a ratio of 0.9 (gram atoms of nitrogen to phosphorus). The use of less amine than will provide 0.5 gram atom of nitrogen (per gram atom of phosphorus) results in a product which produces a paint film tending to develop pin holes whereas the use of more amine will provide 2.5 gram atoms of nitrogen resulting in a product which produces a paint film having reduced gloss.

The preparation of the nitrogen- and phosphorus-containing compositions of this invention is illustrated by the following examples:

EXAMPLE 21

A phosphorus-containing composition is prepared as in Example 12 except that the following amounts of materials are used: 3120 grams (30.1 moles) of neopentyl glycol, 2304 grams (12.0 moles) of trimellitic anhydride, 568 grams (4.0 moles) of phosphorus pentoxide, 3040 grams of Cellosolve and 500 grams of toluene. The toluene is added just before the phosphorus pentoxide and is removed by distillation from the phosphorus-containing intermediate product mixture. A mixture of 756 grams of this intermediate product, 101 grams of a mixture of tertiary alkyl primary amines wherein the tertiary alkyl group contains an average of 13 carbon atoms and 143 grams of an aromatic petroleum solvent (having a boiling range of 171°–278° C. and a Kauri Butanol Value of 97.2) is prepared and agitated until a homogeneous product is obtained. This product contains phosphorus and nitrogen (gram atoms) in the ratio of 1:0.75 (P:N).

EXAMPLE 22

Five additional nitrogen- and phosphorus-containing compositions are prepared as in Example 21 except that the following amounts of materials are used:

|   | Phosphorus-containing intermediate product, grams | Tertiary alkyl primary amines, grams | Aromatic solvent, grams |
|---|---|---|---|
| A | 748 | 106 | 146 |
| B | 739 | 112 | 149 |
| C | 732 | 117 | 151 |
| D | 724 | 122 | 154 |
| E | 717 | 127 | 156 |

The P:N ratios of the above products are 1:0.80, 1:0.85, 1:0.90, 1:0.95 and 1:1, respectively.

EXAMPLE 23

A mixture of 1240 grams of the phosphorus-containing composition prepared as in Example 12, 269 grams of n-octadecyl amine and 300 grams of the high boiling aromatic solvent of Example 22 is prepared and agitated for several minutes whereupon a clear, homogeneous solution is obtained. The P:N ratio is 1:1.

EXAMPLE 24

A mixture of 1240 grams of the phosphorus containing composition prepared as in Example 3, 157 grams of n-decyl amine and 300 grams of butyl Cellosolve is prepared and shaken for five minutes whereupon a clear, homogeneous solution is obtained. The P:N ratio is 1:1.

EXAMPLE 25

The procedure of Example 24 is repeated using 157 grams of diisoamyl amine instead of n-decyl amine.

EXAMPLE 26

The procedure of Example 24 is repeated using 229 grams of N,N-di-n-hexyl ethanolamine instead of n-decyl amine.

EXAMPLE 27

A phosphorus- and nitrogen-containing composition is prepared as in Example 21 except that the proportions of reactants used are such as to result in a product having phosphorus and nitrogen (gram atoms) in the ratio of 1:0.73 (P:N).

EXAMPLE 28

A phosphorus- and nitrogen-containing composition is prepared as in Example 21 except that the proportions of reactants used are such as to result in a product having phosphorus and nitrogen (gram atoms) in the ratio of 1:0.79 (P:N).

EXAMPLE 29

A phosphorus- and nitrogen-containing composition is prepared as in Example 21 except that the proportions of reactants used as such to result in a product having phosphorus and nitrogen (gram atoms) in the ratio of 1:2.0 (P:N).

EXAMPLE 30

A mixture of 571 grams of the phosphorus-containing composition prepared as in Example 16, 245 grams of N-octadecyl propylene diamine and 600 grams of the high boiling aromatic solvent of Example 22 is prepared and agitated for several minutes whereupon an exothermic reaction occurs and a clear, homogeneous solution results. The P:N ratio is 1:1.5.

The compositions of this invention are useful on virtually all known metal surfaces. They are most useful on the surfaces of ferrous metal, galvanized metal, aluminum, and zinc. Phosphated metal surfaces, especially phosphated ferrous metal surfaces are improved markedly with respect to their rust-protective and paint-retentive properties, by the subsequent application of protective films prepared from compositions of this invention. Such phosphated ferrous metal surfaces which have been phosphated by a calcium-containing, zinc phosphating bath, as described in U.S. Pat. 3,090,709 are especially suitable.

The phosphorus- and nitrogen-containing compositions of this invention can be employed as the only film-forming component of the coating composition. That is, the phosphorus- and nitrogen-containing compositions per se, such as illustrated in Examples 21–30 above, form very effective protective films on metal surfaces. Even thin films, e.g., 0.5 mil, are useful. Ordinarily, these phosphorus- and nitrogen-containing compositions are diluted with volatile, inert, organic solvents to facilitate application of the coating to the metal surface. Suitable illustrative solvents are set forth below. The term "volatile" as used in the present specification is intended to encompass those organic solvents which evaporate readily upon standing at room temperature or upon the application of heat up to a temperature below the decomposition temperature of a given phosphorus- and nitrogen-containing composition. The temperatures utilized in drying will normally not exceed about 400° C.

Another important characteristic of the protective films wherein the phosphorus- and nitrogen-containing composition per se is the major component is their receptiveness to subsequent topcoats of other known types of siccative organic coatings conventionally applied to metal surfaces. Such a combination coating is remarkably effective in protecting the metal surface.

Another important characteristic of the phosphorus- and nitrogen-containing compositions per se is their compatibility with other conventional types of siccative organic coatings used to protect metal surfaces. Because of this compatibility, a diverse group of effective metal coating compositions comprising mixtures of both types of coatings is possible, for example, from about 0.01% to about 99% by weight of a phosphorus- and nitrogen-containing composition with the remainder of the composition being one or more conventional siccative organic coating compositions. The percent by weight referred to is intended to exclude volatile components in the compositions which are to be removed during film-formation. These combinations of phosphorus- and nitrogen-containing compositions and siccative organic coating compositions result in a variety of coatings which can be applied to various metal surfaces to obviate many metal corrosion problems. Furthermore, siccative coatings containing the phosphorus and nitrogen compositions of this invention provide coatings which are both very hard and flexible and which have a relatively permanent high gloss. An especially useful application of siccative organic coating compositions containing the composition of this invention is the deposition of a protective coating on galvanized surfaces.

Siccative organic coatings for metals are well known in the art and include paints, lacquers, enamels, varnishes, primers, and synthetic resins coating compositions. Representative examples of some of these materials suitable for coating metal are found in Singer, Fundamentals of Paint, Varnish, and Lacquer Technology, published by the American Paint Journal Company, St. Louis, 1957. Still other siccative organic coatings for metals are disclosed in "Modern Plastics," vol. 38, No. 1A, September 1960. These disclosures are incorporated herein by reference since there is no need to lengthen this specification to describe an admittedly old component of the present compositions.

The siccative organic coating compositions contemplated for use in combination with the phosphorus- and nitrogen-containing compositions of the invention can comprise volatile or non-volatile vehicles as solvents or dispersants for the other components therein. Thus, they can include paints and varnishes containing drying oils such as linseed oil, tung oil or China wood oil, oiticica oil, dehydrated castor oil, fish oil, soya bean oil, safflower oil, hempseed oil, sunflower seed oil, and the like. Suitable resinous components for use in these siccative coatings include phenolic resins, polyester resins including alkyd resins, vinyl resins such as polyvinylchloride and polyvinylacetate, urea-formaldehyde resins, melamine-formaldeyhde resins, and the like. In addition, the siccative organic coatings can contain metal driers for drying and semi-drying oils such as cobalt, lead, manganese, iron, calcium, and zinc in the form of salts with carboxylic acids which are soluble in said oils such as as the metal linoleates, oleates, octanoates, and naphthenates. Moreover, the siccative organic coatings can contain various pigments, plasticizers, stabilizers, etc., normally found in siccative organic coatings.

These siccative organic coatings are subject to drying by various well known mechanisms. Thus, volatile solvents or dispersants evaporate leaving deposited the organic material which forms the protective coating. The coating may contain a drying oil or semi-drying oil which oxidizes to form a tough dry coating. Drying of such oils is facilitated by incorporation of metal driers into the coating compositions. In addition, the coating may dry by chemical reaction among the various components thereof. Thus, epoxy films can be formed on metals by the heat induced reaction of an epoxy material and a crosslinking agent, e.g., an epoxy-phenolic or epoxy-urea film-forming composition. The mechanism by which the siccative coatings "dry" is not critical to the invention.

The composition of this invention and the coating compositions containing same may be applied to metal articles by any one of the methods ordinarily used in the paint and varnish industry including brushing, spraying, dip-coating, flow-coating, roller-coating, and the like. The viscosity of the coating compositions may be adjusted for the particular method of application selected by adding a suitable amount of one or more volatile, inert organic solvents such as benzene, xylene, mesitylene, aromatic petroleum spirits, turpentine, or other appropriate solvents. The compositions of this invention may be likewise diluted with the solvents indicated as useful reaction media. When it is desired to coat phosphated steel with a composition of this invention it is often desirable to apply such compositions from water-base solutions in the rinsing zone of a phosphating production line. The metal surface which has been thus coated is then cured or dried either by exposure to air or by means of a baking procedure. A dry film thickness of a composition of this invention or of a coating composition containing the same ranging from about 0.01 mil to about 4 mils, preferably 0.02-2 mils, is usually required to provide adequate protection for the metal article. Coatings heavier than 4 mils can be used, if desired, but they normally contribute little in the way of additional protection. When the compositions of this invention are to be used as paint bases or primers, a dry film thickness of at least about 25 mg./ft.$^2$ is effective. A dry film thickness of 50-300 mg./ft.$^2$ is preferred.

In drying the films prepared from the compositions of this invention, as indicated, a baking procedure may be used or the films may be dried by exposure to air. The baking temperature may be from about 100° C. to about 400° C. This baking temperature range is, however, merely illustrative. That is, the baking step serves to remove any solvent in the film and to react the components in the film with each other and with the metal surface. Thus, where a baking step is used, the temperature will vary depending upon the extent to which the reactants of compositions of this invention have been reacted prior to application as coatings and the time requirements inherent in particular manufacturing schedules for production of coated metal articles.

To enhance the properties of the compositions of this invention in the aforesaid functions, it is often desirable to admix therewith small portions, viz, 1-5% by weight or more, of chromic acid, zinc nitrate, amine chromates, amine molybdates, and metal dichromates such as zinc and calcium dichromates. In many instances, addition of one or more of the indicated improving agents will enhance the corrosion resisting properties of the compositions of this invention. In some instances, it is desirable to admix the compositions of this invention with conventional pigments, e.g., titanium dioxide and chrome green, and conventional improving agents such as pigment extenders, anti-skinning agents, driers, gloss agents, and color stabilizers.

As indicated, the compositions of this invention are useful as additives for siccative organic coatings. They may also be blended or modified with siccative organic coating compositions. Coating compositions within the scope of this invention include those comprising a siccative organic coating composition and from about 0.01% by weight to about 99% by weight on a non-volatile materials basis of a composition of this invention. As additives, concentrations of about 0.01-10% of the compositions of this invention in siccative organic coating compositions impart anti-corrosion and other desirable properties to film prepared therefrom without seriously affecting other useful properties of such coating compositions. In some instances, addition of small amount, e.g., 1-10%, of siccative organic coating compositions to the compositions of this invention allow for improved film performance without seriously altering the properties of the compositions of this invention. The combination of a siccative organic coating composition and from about 10% to about 90% of a composition of this invention provides films which are often effective in solving specific coating problems.

To prepare the final coating compositions, the compositions of this invention may simply be admixed with the appropriate solvent or solvents at the appropriate concentrations for any given coating procedure. Ordinarily, a concentrate of a composition of this invention is prepared by dissolving it in a limited amount of solvent, optionally with other siccative organic coating compositions and improving agents, and the concentrate is then diluted with additional solvent to prepare the final coating compositions.

The relative proportions of the ingredients in a siccative organic coating composition determine the properties of such composition and usually these proportions are carefully controlled. The proportion of pigment to binder (non volatile vehicle), for example, is determinative of hiding power and gloss, i.e., the more pigment the greater the hiding power, and the more binder the higher the gloss. Pigments, of course, include such things as titanium dioxide and lead oxide. The binder, in this instance, is the novel phosphorus- and nitrogen-containing composition. The proportion of pigment is ordinarily spoken of as "pigment volume concentration," i.e., PVC, and is the volume percentage of pigment with respect to the total volume of pigment plus binder. Thus, a siccative, organic coating composition having 12 parts by volume of pigment and 36 parts by volume of binder has PVC of 25%. It is a notable feature of the compositions of this invention that they impart a high degree of gloss to a siccative organic coating composition at relatively low concentrations.

To illustrate the invention more specifically, examples of formulations containing the compositions of this invention are set forth. Unless otherwise indicated, all parts are by weight.

Formulation A:
  Product prepared as in Example 22E (from 66.6 parts of phosphorus-containing composition and 10.6 parts of a mixture of tertiary alkyl primary amines wherein the tertiary alkyl groups contain an average of 13 carbon atoms)_____ 77.2
  Butyl Cellosolve_____ 10.0
  Aromatic petroleum solvent composed primarily of toluene substituted with lower alkyl radicals, having a boiling range of 161°–177° C. and a Kauri Butanol value of 93.3_____ 28.1
  Titanium dioxide (pigment)_____ 40
Formulation B:
  Product prepared as in Example 27 (from 71.9 parts of phosphorus-containing composition and 8.5 parts of a mixture of tertiary alkyl primary amines wherein the tertiary alkyl groups contain an average of 13 carbon atoms)_____ 90.4
  Aromatic petroleum solvent having a boiling range of 171°–278° C. and a Kauri Butanol value of 97.2_____ 24.5
  Titanium dioxide (pigment)_____ 21.9
  Cyan Blue (pigment)_____ 0.5
Formulation C:
  Product prepared as in Example 28 (from 64.5 parts of phosphorus-containing composition and 8.2 parts of a mixture of tertiary alkyl primary amines wherein the tertiary alkyl groups contain an average of 13 carbon atoms)_____ 72.7
  Aromatic petroleum solvent having a boiling range of 171°–278° C. and a Kauri Butanol value of 97.2_____ 23.2
  Titanium dioxide (pigment)_____ 21.9
  Monastral green (pigment)_____ 0.5
Formulation D:
  Product prepared as in Example 22E (from 327 parts of phosphorus-containing composition and 58 parts of a mixture of tertiary alkyl primary amines wherein the tertiary alkyl groups contain an average of 13 carbon atoms)_____ 385
  Aromatic petroleum solvent having a boiling range of 171°–278° C. and a Kauri Butanol value of 97.2_____ 47
  Ethyl Cellosolve_____ 25
  Aromatic petroleum solvent composed primarily of toluene substituted with lower alkyl radicals, having a boiling range of 161°–177° C. and a Kauri Butanol value of 93.3_____ 229
  Titanium dioxide (pigment)_____ 264
  Cyan Blue (pigment)_____ 11
Formulation E:
  Product prepared as in Example 21 (from 346 parts of phosphorus-containing composition and 46 parts of a mixture of tertiary alkyl primary amines wherein the tertiary alkyl groups contain an average of 13 carbon atoms)_____ {346, 46}
  Aromatic petroleum solvent having a boiling range of 171°–278° C. and a Kauri Butanol value of 97.2_____ 66
  Aromatic petroleum solvent composed primarily of toluene substituted with lower alkyl radicals, having a boiling range of 161°–177° C. and a Kauri Butanol value of 93.3_____ 229
  Titanium dioxide (pigment)_____ 264
  Cyan Blue (pigment)_____ 11
Formulation F:
  Product prepared as in Example 22E (from 66.6 parts of phosphorus-containing composition and 15.0 parts of n-octadecyl amine)_____ 81.6
  Butyl Cellosolve_____ 10.0
  Aromatic petroleum solvent composed primarily of toluene substituted with lower alkyl radicals, having a boiling range of 161°–177° C. and a Kauri Butanol value of 93.3_____ 28.1
  Titanium dioxide (pigment)_____ 40

The utility of the compositions of this invention is more specifically illustrated by the examples set forth below.

EXAMPLE I

Three 4-inch x 12-inch panels of galvanized 20-gauge SAE 1020 cold-rolled steel are roll-coated, respectively, with three different compositions of this invention. The roll-coated panels are baked in an oven at 232° C. for 5 minutes. The dry film thickness of the coating on these panels is about 1 mil.

The panels are scribed with a sharp instrument through the paint and into the metal along a line one inch from and parallel to the longer edge and beginning one inch from the one shorter edge and extending to one inch from the opposite shorter edge. The painted panels are then subjected to the Salt Fog Corrosion test described in ASTM procedure B 117–54T. In this test the panels, inclined 15° from the vertical with the scribed side up, are maintained in contact with a mist or fog of 5% aqueous sodium chloride for a predetermined time (in this case, 240 and 480 hours) at 95°±2° F. The panels are removed from the Salt Fog chamber, washed with tap water to remove any salt deposit, and adhesive cellophane tape is applied along the scribe lines and over the entire area of the panel. The tape is abruptly removed from the panels which are inspected to determine the percent paint still adhering to the galvanized metal substrate on the upper portion and the loss of adhesion caused by corrosion from the scribed lines measured in thirty-seconds of an inch, called "creep." The results of the inspection are given in Table I.

TABLE I.—PAINT BASE

| Dip-coating Composition | Percent adhesion | | Creep | |
|---|---|---|---|---|
| | 240 hrs. | 480 hrs. | 240 hrs. | 480 hrs. |
| Formulation A | 80 | 70 | 3 | 5 |
| Formulation B | 85 | 80 | 4 | 6 |
| Formulation C | 85 | 80 | 4 | 6 |

EXAMPLE II

Three 4-inch x 12-inch panels of galvanized 20-gauge SAE 1020 cold-rolled steel are roll-coated, respectively, with Formulations A, B and C. The roll-coated panels are baked in an oven at 232° C. for 5 minutes. The dry film thickness of the coating on these panels is about 1 mil.

A set of Koh-I-Noor X1500 pencils ranging in hardness from 6B to 9A are each sharpened to a 15° conical point, then blunted with fine (400 grade) sandpaper to a circular surface of $\frac{1}{64}''$ to $\frac{1}{37}''$ diameter. Beginning with the softest pencil, each pencil is applied at an angle of 45° to the test surface in an attempt to dig into the surface. That pencil whose point first crushes upon such penetration measures the hardness of the penetrated surface, i.e., if the first pencil to be thus damaged is a 5H pencil the hardness of the test surface is rated 5H.

The three test panels here each scored 9H+, i.e., not even the hardest pencil was damaged, an indication of an unusually hard surface.

EXAMPLE III

Five test panels were prepared as in Example I, the surface coatings (about 1 mil thick) being derived from Formulations A, B, C, D and E. The gloss rating of each was ascertained by means of a Gardner Portable 60° Glossmeter. Those ratings were 48, 55, 56, 73 and 70, respectively. Such ratings are referable to a scale of 0–100 with 0 representing no gloss whatsoever and 100 representing a very high gloss.

What is claimed is:

1. A nitrogen- and phosphorus-containing composition, compatible with organic solvents and siccative vehicles and essentially water-insoluble, prepared by the process comprising mixing (A) a phosphorus-containing composition prepared by the process which comprises reacting at a temperature of at least about 50° C. a mixture comprising from about 1 to about 15 moles of a benzene polycarboxylic reactant having at least 2 carboxylic groups selected from the class consisting of acid and anhydride groups; from about 1 to about 15 moles of a polyhydroxy compound selected from the class consisting of polyhydric alcohols and polyhydric phenols, and about 1 mole of a phosphorus acid reactant selected from the class consisting of phosphorus pentoxide, phosphoric acid and mixtures thereof, with (B) an aliphatic amine material having at least about 8 carbon atoms.

2. The nitrogen- and phosphorus-containing composition of claim 1 wherein the aliphatic amine material is a primary amine.

3. The nitrogen- and phosphorus-containing composition of claim 1 wherein the aliphatic amine material is a mixture of tertiary alkyl primary amines having an average of 13 carbons.

4. The nitrogen- and phosphorus-containing composition of claim 1 wherein the benzene polycarboxylic reactant of (A) is trimellitic anhydride.

5. The nitrogen- and phosphorus-containing composition of claim 1 wherein the phosphorus acid reactant of (A) is phosphorus pentoxide.

6. The nitrogen- and phosphorus-containing composition of claim 1 wherein the polyhydroxy compound of (A) is neopentyl glycol.

7. A nitrogen- and phosphorus-containing composition compatible with organic solvents and siccative vehicles and essentially water-insoluble, prepared by the process comprising mixing (A) a phosphorus-containing composition prepared by the process which comprises reacting at a temperature of at least about 50° C. a mixture comprising from about 1 to about 15 moles of a benzene tricarboxylic reactant selected from the class consisting of acid and anhydride groups, and from about 1 to about 15 moles of a polyhydroxy alcohol to form an intermediate reaction product and then reacting said intermediate reaction product with about 1 mole of phosphorus pentoxide, and (B) an aliphatic amine material having at least about 8 carbon atoms.

8. The nitrogen- and phosphorus-containing composition of claim 7 wherein the benzene tricarboxylic reactant is trimellitic anhydride.

9. The nitrogen- and phosphorus-containing composition of claim 8 wherein the aliphatic amine material is a mixture of tertiary alkyl primary amines having an average of 13 carbon atoms.

10. The method of protecting a metal surface from corrosion comprising applying to said surface a film of the nitrogen- and phosphorus-containing composition of claim 1.

11. The method of protecting a metal surface from corrosion comprising applying to said surface a film of the nitrogen- and phosphorus-containing composition of claim 9.

12. The method of claim 11 wherein the metal surface is a galvanized surface.

13. A metal article coated with the nitrogen- and phosphorus-containing composition of claim 1.

14. A galvanized metal article coated with the nitrogen- and phosphorus-containing composition of claim 1.

15. A siccative organic coating composition containing at least about 0.01% by weight of the total composition, exclusive of volatile materials, of a nitrogen- and phosphorus-containing composition, compatible with organic solvents and siccative vehicles and essentially water-insoluble, prepared by the process comprising mixing (A) a phosphorus-containing composition prepared by the process which comprises reacting at a temperature of at least about 50° C. a mixture comprising from about 1 to about 15 moles of a benzene polycarboxylic reactant having at least 2 carboxylic groups selected from the class consisting of acid and anhydride groups; from about 1 to about 15 moles of a polyhydroxy compound selected from the class consisting of polyhydric alcohols and polyhydric phenols, and about 1 mole of a phosphorus acid reactant selected from the class consisting of phosphorus pentoxide, phosphoric acid and mixtures thereof, with (B) an aliphatic amine material having at least about 8 carbon atoms.

16. The coating composition of claim 15 wherein the benzene polycarboxylic reactant is trimellitic anhydride, the polyhydroxy compound is a polyhydric alcohol and the phosphorus acid reactant is phosphorus pentoxide.

17. The coating composition of claim 16 wherein the aliphatic amine material is a mixture of tertiary alkyl primary amines having an average of 13 carbon atoms.

18. The method of protecting a metal surface from corrosion comprising applying to said surface a film of the coating composition of claim 15.

19. The method of protecting a metal surface from corrosion comprising applying to said surface a film of the coating composition of claim 17.

20. The method of protecting a galvanized metal surface from corrosion comprising applying to said surface a film of the coating composition of claim 15.

21. The method of protecting a galvanized metal surface from corrosion comprising applying to said surface a film of the coating composition of claim 17.

22. A metal article coated with the coating composition of claim 15.

23. A metal article coated with the coating composition of claim 17.

24. A galvanized metal article coated with the coating composition of claim 15.

25. A galvanized metal article coated with the coating composition of claim 17.

References Cited

UNITED STATES PATENTS 3,415,766  12/1968  Jedlicka _____ 148—6.15X
3,415,788  12/1968  Jedlicka _____ 148—6.15X ALFRED L. LEAVITT, Primary Examiner J. R. BATTEN, JR., Assistant Examiner U.S. Cl. X.R.

117—71, 132; 148—6.15; 260—22, 32.8, 33.2, 33.6, 40, 47, 75, 842, 850, 860, 873, 924